(12) United States Patent
Wood (10) Patent No.: US 10,384,795 B2
(45) Date of Patent: *Aug. 20, 2019

(54) AIRCRAFT FUEL VENT PIPE

(71) Applicant: AIRBUS OPERATIONS LIMITED, Bristol (GB)

(72) Inventor: Norman Wood, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1 day.

This patent is subject to a terminal disclaimer.

(21) Appl. No.: 15/962,010

(22) Filed: Apr. 25, 2018

(65) Prior Publication Data

US 2018/0237151 A1    Aug. 23, 2018

Related U.S. Application Data (63) Continuation of application No. 14/896,464, filed as application No. PCT/GB2014/051773 on Jun. 10, 2014, now Pat. No. 10,000,295.

(30) Foreign Application Priority Data

Jun. 12, 2013 (GB) .................................. 1310467.4

(51) Int. Cl.
*B64D 37/32* (2006.01)
*B64D 37/00* (2006.01)

(52) U.S. Cl.
CPC ........... *B64D 37/32* (2013.01); *B64D 37/005* (2013.01)

(58) Field of Classification Search
CPC .............................. B64D 37/32; B64D 37/005
See application file for complete search history.

(56) References Cited

U.S. PATENT DOCUMENTS

| | | | |
|---|---|---|---|
| 630,315 | A | 8/1899 | Barclay |
| 1,144,306 | A | 6/1915 | Mock |
| 2,254,587 | A | 9/1941 | Williams |
| 3,578,008 | A | 5/1971 | Clark |
| 3,906,976 | A | 9/1975 | Nohr et al. |

(Continued)

FOREIGN PATENT DOCUMENTS

| | | |
|---|---|---|
| DE | 3436320 A1 | 4/1986 |
| EP | 1780123 A2 | 5/2007 |

(Continued)

OTHER PUBLICATIONS

Search Report dated Dec. 11, 2013 issued in Great Britain Application No. 1310467.4; 1 pp.

(Continued)

*Primary Examiner* — P. Macade Nichols
(74) *Attorney, Agent, or Firm* — Nixon & Vanderhye P.C.

(57) ABSTRACT

An aircraft fuel vent pipe with a pipe body containing a duct which extends along a duct axis between an open end and a closed end. A burst disc closes the closed end of the duct. One or more devices are provided in the duct, the device(s) being positioned or shaped to enable the burst disc to be visually inspected by looking along the duct through its open end, and to modify a sectional profile of the duct transverse to the duct axis so that the sectional profile of the duct changes between different stations along the duct axis. The one or more device(s) inhibit the formation of standing acoustic waves in the duct.

24 Claims, 9 Drawing Sheets

(56) References Cited

U.S. PATENT DOCUMENTS

| | | | |
|---|---|---|---|
| 4,691,894 A * | 9/1987 | Pyotsia | F16K 1/222 |
| | | | 251/127 |
| 8,783,280 B2 * | 7/2014 | Yandle, II | B61D 5/06 |
| | | | 137/347 |
| 9,285,045 B2 | 3/2016 | Hutchings et al. | |
| 2007/0102583 A1 | 5/2007 | Cutler et al. | |
| 2008/0149201 A1 | 6/2008 | Sommerville et al. | |
| 2008/0295905 A1 | 12/2008 | Sandiford et al. | |
| 2011/0259667 A1 | 10/2011 | Buessow | |

FOREIGN PATENT DOCUMENTS

| | | |
|---|---|---|
| EP | 1936249 A2 | 6/2008 |
| EP | 2381154 A1 | 10/2011 |
| GB | 126897 A | 4/1935 |
| GB | 786872 A | 11/1957 |
| GB | 1413259A A | 11/1975 |

OTHER PUBLICATIONS

ISR and WO date Sep. 12, 2014 issued in PCT/GB2014/051773: 13 pp.

B.D. Knotts et al: "Suppression of flow-acoustic coupling in sidebranch ducts by interface modification", Journa of Sound and Vibration, vol. 265, No. 5, Aug. 1, 2003, pp. 1025-1045.

\* cited by examiner

AIRCRAFT FUEL VENT PIPE

RELATED APPLICATIONS

The present application is a continuation of U.S. application Ser. No. 14/896,464 filed Dec. 7, 2015, which is a National Phase of International Application Number PCT/GB2014/051773 filed Jun. 10, 2014, which claims priority to Great Britain Application Number 1310467.4 filed Jun. 12, 2013, the disclosures of which are hereby incorporated by reference herein in their entirety.

FIELD OF THE INVENTION

The present invention relates to an aircraft fuel vent pipe, and a method of inhibiting the formation of standing acoustic waves in an aircraft fuel vent pipe.

BACKGROUND OF THE INVENTION

Figure 18:
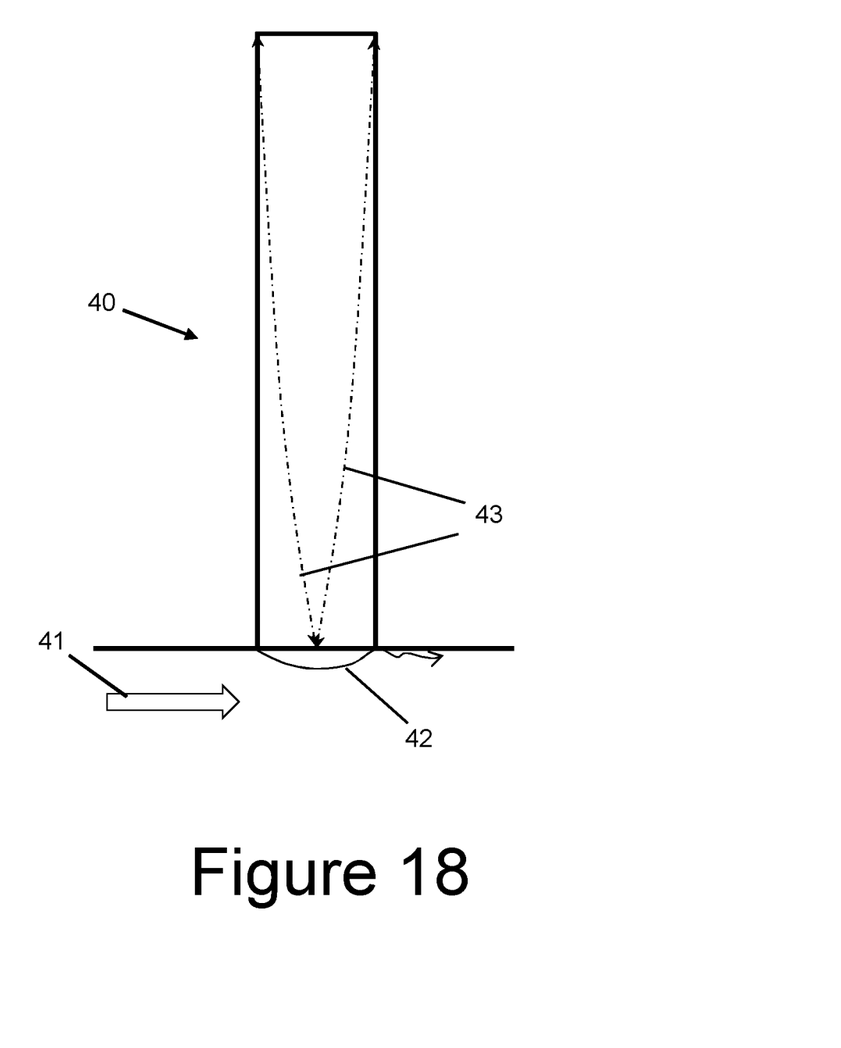
FIG. 18 is a schematic view of an aircraft fuel vent pipe with a standing wave.

FIG. 18 illustrates an aircraft fuel vent pipe 40. If the aircraft fuel tank is overfilled with fuel then the vent pipe 40 is arranged to enable excess fuel to flow out of the fuel tank. For this reason the vent pipe 40 extends downwardly and lies flush with the aerodynamic outer surface of the lower skin of the aircraft wing. Thus the open end of the pipe is exposed to an aerodynamic cross flow of air 41 during flight of the aircraft.

The cross flow generates an instability 42 which generates a strong acoustic tone which emanates from the pipe. It is excited by the natural frequency of the external flow as a function of the local true air speed and the diameter of the pipe. The resonance that occurs is a function of the depth/diameter ratio of the pipe and represents a standing pressure half wave 43.

SUMMARY OF THE INVENTION

A first aspect of the present invention provides an aircraft fuel vent pipe comprising a pipe body containing a duct which extends along a duct axis between an open end and a closed end; a burst disc which closes the closed end of the duct; and one or more devices in the duct, the device(s) being positioned or shaped to enable the burst disc to be visually inspected by looking along the duct through its open end, and to inhibit the formation of standing acoustic waves in the duct.

A second aspect of the invention provides an aircraft fuel vent pipe comprising a pipe body containing a duct which extends along a duct axis between an open end and a closed end; a burst disc which closes the closed end of the duct; and one or more devices in the duct, the device(s) being positioned or shaped to enable the burst disc to be visually inspected by looking along the duct through its open end, and to modify a sectional profile of the duct transverse to the duct axis so that the sectional profile of the duct changes between different stations along the duct axis. Typically the sectional profile of the duct either has different shapes at the different stations, or a rotated version of the same shape at the different stations.

The one or more devices may comprise a device with a sectional shape or an angular position about the duct axis which changes between the different stations along the duct axis. For example the device may have an angular position about the duct axis which changes along the duct axis to form a spiral shape. In one embodiment the spiral shape rotates around three-quarters of a full circle (that is, 270 degrees) along its full length although other ranges of rotation may be possible. Preferably the pitch of the spiral is not an integer function of the length of the duct (so the full length of the spiral does not rotate around 360 degrees or 720 degrees for example).

Optionally the one or more devices comprise first and second devices which are located at different angular positions about the duct axis and offset along the duct axis so that the sectional profile of the duct is modified at a first station along the duct axis by the first device but not the second device, and the sectional profile of the duct is modified at a second station along the duct axis by the second device but not the first device. Optionally the first and second devices have a spiral shape or sectional shape which changes along the length of the duct. Alternatively the first and second devices may be planar.

The (or each) device typically extends or protrudes into the duct, optionally from an inner wall of the pipe body. The (or each) device may be attached to the pipe body—for instance it may be bonded or welded to the pipe body or formed integrally with the pipe body.

The pipe body may consist of a single pipe which provides an inner wall from which the device extends or protrudes into the duct. Alternatively the pipe body may comprise an outer pipe, and an insert which is inserted into the outer pipe and carries the (or each) device—in other words the insert provides the inner wall from which the device extends or protrudes into the duct. The use of such a two-part assembly enables the insert to be retro-fitted into an outer pipe which is part of an existing fuel vent pipe system. The insert may be a pipe (such as a cylindrical frame) or the insert may have a non-tubular structure.

The (or each) device may be positioned and shaped to enable the burst disc to be visually inspected by looking along the duct through its open end along a centre of the duct, the centre of the duct not containing any of the devices. Alternatively the burst disc may be visually inspected by looking along the duct through its open end along a peripheral edge of the duct (i.e. not along its centre).

Typically each device extends into the duct from a base remote from the duct axis to an edge which is its closest point of approach to the duct axis. The base of each device is at a distance $R_{base}$ from the duct axis, and the edge of each device is at a distance $R_{edge}$ (which is less than $R_{base}$) from the duct axis.

A ratio $[(R_{base}-R_{edge})/R_{base}]$ is typically greater than 0.1 and preferably greater than 0.2. This ensures that each device protrudes sufficiently far into the duct in order to inhibit the formation of standing waves.

The ratio $[(R_{base}-R_{edge})/R_{base}]$ is typically less than 0.8 and preferably less than 0.6. This ensures that the burst disc can be easily inspected and the device does not significantly impede the passage of fuel along the duct if the burst disc bursts.

Preferably the ratio $[(R_{base}-R_{edge})/R_{base}]$ is less than 0.6 and greater than 0.2.

The pipe body may have a non-circular sectional shape but more preferably it has an inner wall which is substantially cylindrical.

Preferably the one or more devices consists of a prime number of devices.

The one or more devices may be offset from the burst disc so the burst disc can burst into the duct without being impeded by the device(s). The burst disc may be circular or any other shape.

Preferably a cross-sectional area of the duct does not change between the different stations along the duct axis.

In some embodiments the (or each) device is a fin. In other embodiments the (or each) device is a wedge-shaped device The cross-sectional area of the wedge-shaped device may decrease or increase as it extends along the duct towards the burst disc.

In some embodiments the (or each) device is a fin which extends into the duct from a base to an edge in the duct. Typically each fin has a thin structure, so that a length of the fin from its base to its edge is much greater than its thickness. The fin may extend radially towards the duct axis or at another angle.

An aircraft containing the fuel vent pipe typically comprises a fuel tank coupled to the aircraft fuel vent pipe, the burst disc being arranged to burst and enable fuel to flow from the fuel tank into the duct and out of the open end of the duct.

The aircraft fuel vent pipe may be positioned so that the open end of the duct is exposed to aerodynamic cross flow of air across the open end of the duct during flight of the aircraft—for instance the pipe may be installed in a lower surface of a wing of the aircraft.

Preferably the duct comprises a channel which enables the burst disc (which is in an intact state, in other words it has not burst) which closes the closed end of the duct to be visually inspected by looking along the duct through its open end along the channel The duct axis may be straight, or it might be slightly curved.

A further aspect of the invention provides a method of inhibiting the formation of standing acoustic waves in an aircraft fuel vent pipe, the aircraft fuel vent pipe comprising a pipe body containing a duct which extends along a duct axis between an open end and a closed end; and a burst disc which closes the closed end of the duct, the method comprising inserting one or more devices in the duct, the device(s) being positioned or shaped to enable the burst disc to be visually inspected by looking along the duct through its open end, and to inhibit the formation of standing acoustic waves in the duct. The device(s) and the fuel vent pipe may be according to the first or second aspect invention, as described above.

BRIEF DESCRIPTION OF THE DRAWINGS

Embodiments of the invention will now be described with reference to the accompanying drawings, in which.

DETAILED DESCRIPTION OF EMBODIMENT(S)

An aircraft fuel vent pipe 1 according to a first embodiment of the invention is shown in FIGS. 1 to 5. The pipe comprises a pipe body with a cylindrical outer surface 2 and a cylindrical inner surface 3. The pipe body contains a duct 4 which extends along a straight duct axis 5 between an open end 6 and a closed end which is closed by a circular burst disc 7. The length of the duct between the burst disc 7 and the open end 6 of the duct is typically of the order of 15-20 cm.

Figure 2:
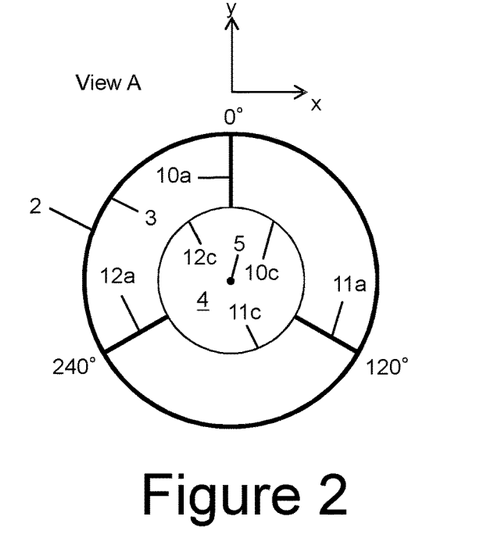
FIG. 2 is a bottom view along a line A of the pipe of FIG. 1 looking into the duct.

The pipe body carries three devices or fins 10-12 which are forged integrally as a single piece with the pipe body 2, 3. Each device 10-12 extends radially into the duct from a base 10d-12d at the inner surface 3 of the pipe body to a free edge 10c-12c half way to the centre of the duct as shown in FIG. 2. This enables the burst disc 7 to be visually inspected by looking along the duct through its open end along a channel at the centre of the duct, this channel not containing any of the devices 10-12.

The radial length of the devices (i.e. their length from the base 10d-12d to the edge 10c-12c) must be sufficiently long to inhibit the formation of standing acoustic waves in the duct, whilst being sufficiently short to enable the burst disc 7 to be easily inspected and not significantly impede the passage of fuel along the duct if the burst disc 7 bursts.

Figure 3:
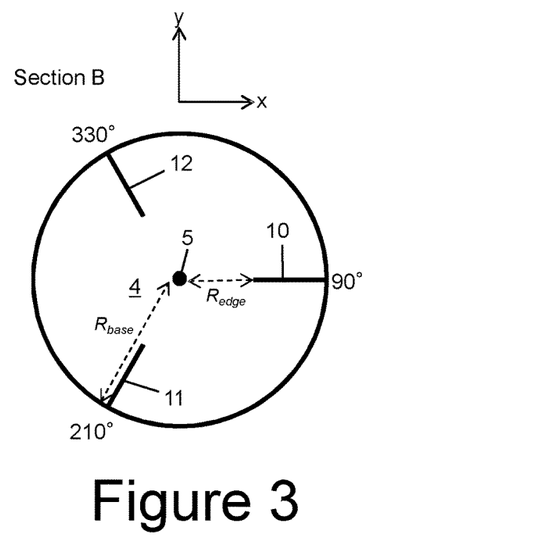
FIG. 3 is a sectional view along a line B of the pipe of FIG. 1.

The duct axis 5 lies at the geometrical centre of the duct in the plane of the cross-section. When viewed in cross-section as in FIGS. 2 and 3, the base 10d-12d of each device is at a distance $R_{base}$ remote from the duct axis 5 (the distance $R_{base}$ being the furthest point of the device from the duct axis 5). Each device extends into the duct to a distance $R_{edge}$ at its edge 10c-12c which is its closest point of approach to the duct axis 5. In the example of FIG. 3 the ratio $[(R_{base}-R_{edge})/R_{base}]$ is 0.5, since each edge is half way to the geometrical centre of the duct. This leaves a channel at the centre of the duct, not containing any of the devices 10-12, with a radius $R_{edge}$. In another example $R_{edge}$ may be increased so that the ratio $(R_{base}-R_{edge})/R_{base}$ is 0.25.

Each fin has a thin structure, so that a length of the fin from its base 10d-12d to its free edge 10c-12c is much greater than its thickness (typically more than five or ten times greater).

Figure 1:
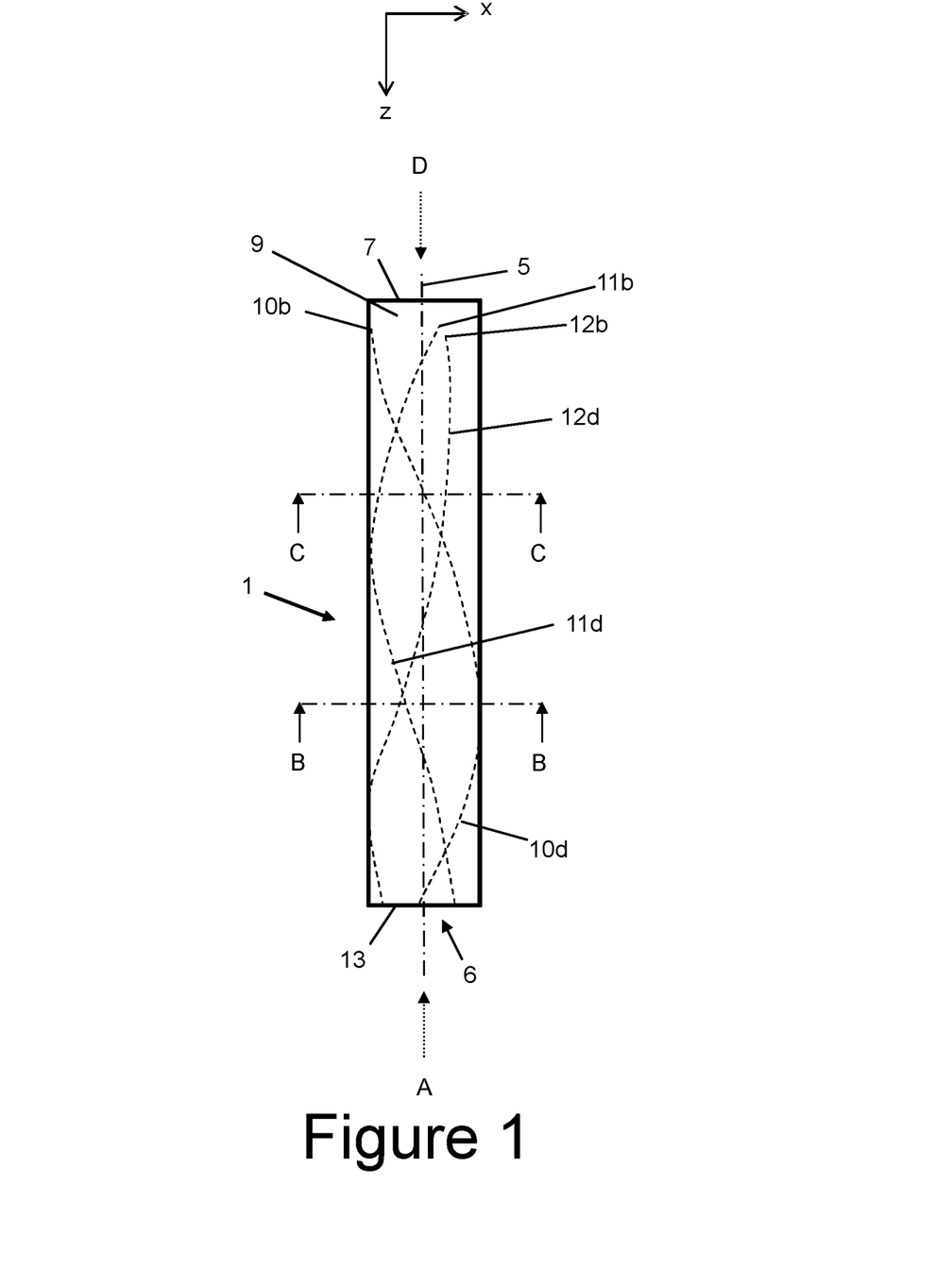
FIG. 1 is a side view of an aircraft fuel vent pipe according to a first embodiment of the invention.
Figure 4:
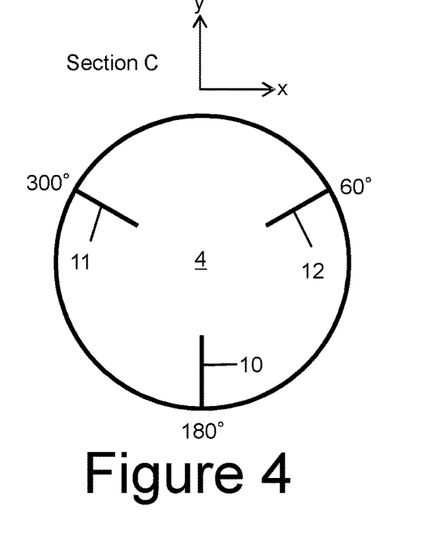
FIG. 4 is a sectional view along a line C of the pipe of FIG. 1.
Figure 5:
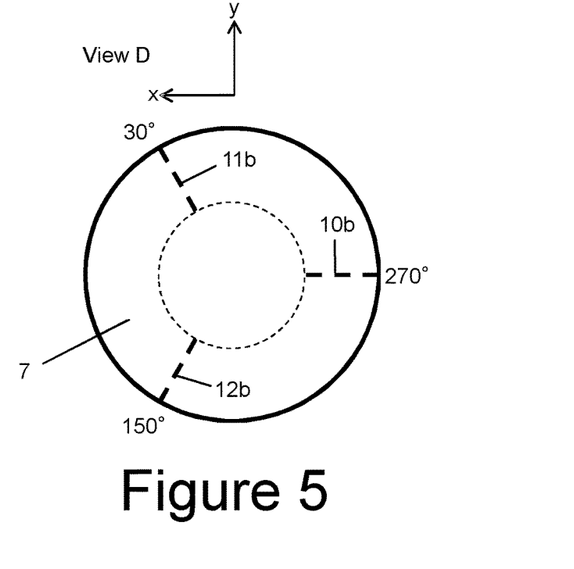
FIG. 5 is a top view along a line D of the pipe of FIG. 1.

Each device 10-12 extends along a majority (over 50%) of the full length of the duct between an outboard edge 10a-12a shown in FIG. 2 to an inboard edge 10b-12b shown in FIGS. 1 and 5. Each device 10-12 has an angular position about the duct axis 5 which changes along the duct axis to form a spiral shape. Due to this spiral shape, the devices 10-12 collectively modify a sectional profile of the duct transverse to the duct axis so that the sectional profile of the duct changes between different stations along the duct axis as shown in FIGS. 2 to 5. FIG. 2 is a bottom view of the pipe viewed along an arrow A in FIG. 1, FIGS. 3 and 4 are cross-sections transverse to the duct axis 5 at different stations B and C spaced apart along the length of the duct, and FIG. 5 is a top view of the pipe viewed along an arrow D in FIG. 1. Note that FIGS. 3 and 4 show the sectional profile of the duct at a single axial point or station, and for ease of illustration they do not show any parts which lie behind the plane of the cross-section.

The outboard edges 10a-12a of the devices shown in FIG. 2 lie flush with an annular rim 13 of the pipe body at the open end 6 of the duct and extend radially towards the duct axis 5. As the devices extend inboard towards the burst disc 7, the base 10d-12d at which they join the pipe body describes a spiral shape which rotates around three-quarters of a full circle (that is, 270 degrees).

The outboard edges 10a-12a at the open end of the duct show in FIG. 2 are positioned at angular (azimuthal) positions (relative to the duct axis 5) of 0 degrees, 120 degrees and 240 degrees respectively. At the position of FIG. 3 the devices 10-12 have rotated to angular positions of 90 degrees, 210 degrees and 330 degrees respectively. At the position of FIG. 4 the devices 10-12 have rotated to angular positions of 180 degrees, 300 degrees and 60 degrees respectively. Finally, at the closed end of the duct shown in FIG. 5 the devices 10-12 have rotated to angular positions of 270 degrees, 30 degrees and 150 degrees respectively. Thus although the sectional shape and area of the duct remains generally the same, the devices 10-12 modify the sectional profile of duct so that this shape rotates about the duct axis between the different stations as can be seen by comparing FIGS. 2 to 5. By modifying the sectional profile of the duct so that it changes along the duct axis in this way, the devices 10-12 inhibit the formation of standing acoustic waves in the duct.

As shown in FIG. 1 the inboard edges 10b-12b of the devices are offset axially from the burst disc by a gap 9 so the burst disc 7 can burst into the duct without being impeded by the devices.

In an alternative embodiment (not shown) rather than being flush with the annular rim 13 of the pipe body, the outboard edges 10a-12a of the devices are set back within the duct from the annular rim 13.

FIGS. 1 to 5 show a pipe 1 with three devices 10-12, but a similar effect can be achieved with only one device, five devices, or any other number of devices (preferably a prime number of devices).

The three devices 10-12 are forged integrally as a single piece with the pipe body 2, 3. Alternatively the three devices 10-12 may be formed integrally as a single piece with the pipe body 2,3 by a process of additive layer manufacturing. Alternatively the three devices 10-12 may be carried by a cylindrical frame (not shown) which is retro-fitted by inserting it into the duct and holding it in place with a cover plate (not shown) at the duct outlet.

FIGS. 6 to 10 show an aircraft fuel vent pipe 20 according to a second embodiment of the invention. Many parts are the same as in the first embodiment and in this case the same reference numbers are used. Instead of containing three spiral devices 10-12, the pipe 20 contains three planar devices or fins 21-23, with the point at which each device 21-23 joins the pipe body describing a straight line parallel with the duct axis.

Figure 7:
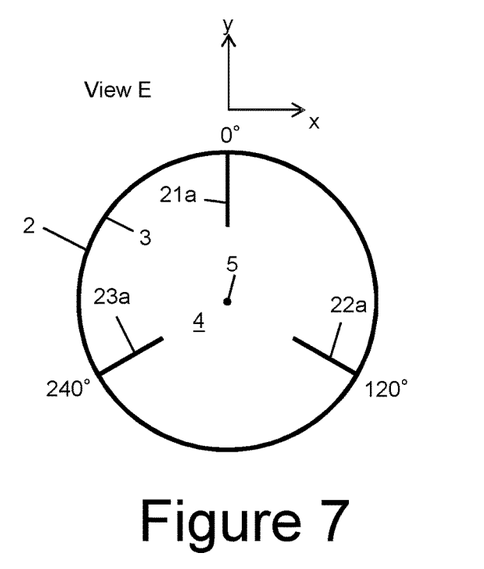
FIG. 7 is a bottom view along a line E of the pipe of FIG. 6.

Each device 21-23 extends radially towards the duct axis 5 from the inner wall 3 of the pipe body into the duct, but stops short of the duct axis 5 at the centre of the duct as shown in FIG. 7. The planar devices 21-23 are positioned at different angular and axial locations to achieve a similar effect to the spiral devices of FIG. 1.

Figure 6:
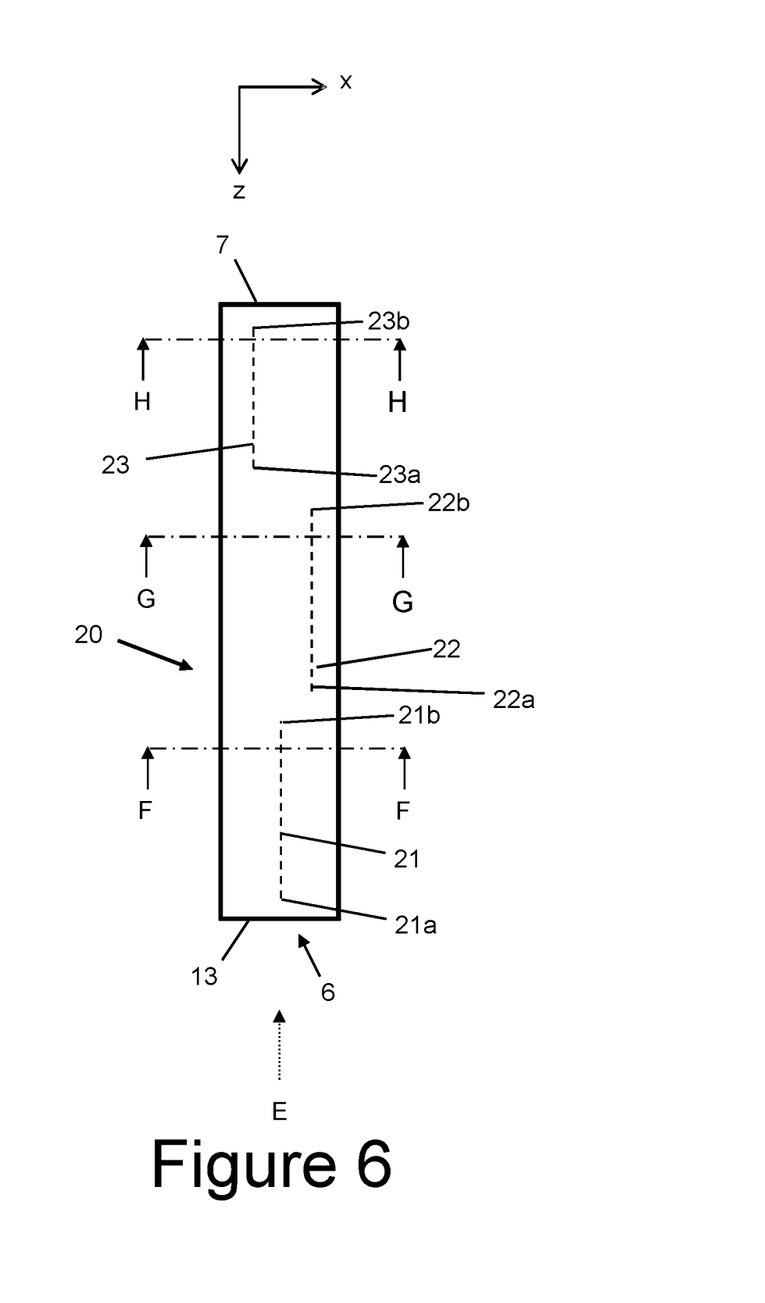
FIG. 6 is a side view of an aircraft fuel vent pipe according to a second embodiment of the invention.

The devices 21-23 each have outboard edges 21a-23a and inboard edges 21b-23b shown in FIGS. 6 and 7. Each device 21-23 runs along only part of the length of the duct, and the devices are staggered at progressively different axial points along the duct so that at any point along the axis of the duct there is only one device. Thus at the station of FIG. 8 there is only one device 21 at an angular position about the duct axis of 0 degrees, at the station of FIG. 9 there is only one device 22 at an angular position about the duct axis of 120 degrees, and at the station of FIG. 10 there is only one device 28 at an angular position about the duct axis of 240 degrees.

Figure 8:
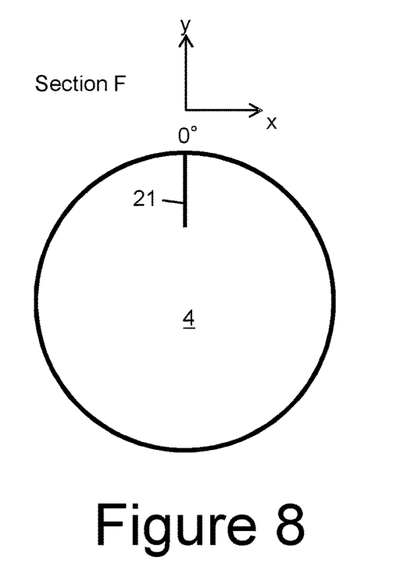
FIG. 8 is a sectional view along a line F of the pipe of FIG. 6.
Figure 9:
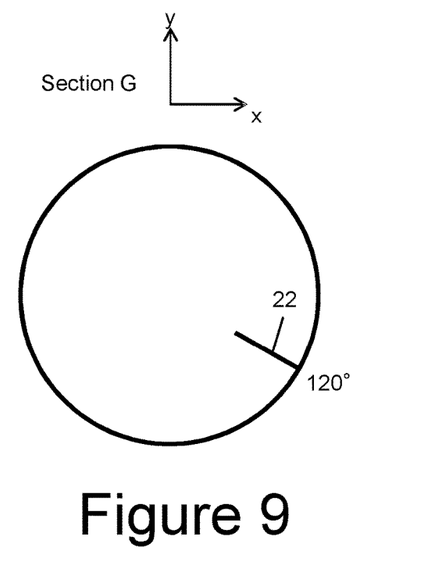
FIG. 9 is a sectional view along a line G of the pipe of FIG. 6.
Figure 10:
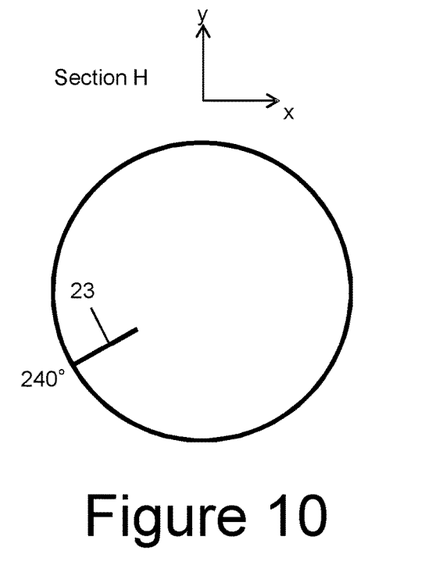
FIG. 10 is a sectional view along a line H of the pipe of FIG. 6.

FIGS. 8-10 are cross-sections through the duct transverse to the duct axis showing the sectional profile of the duct at that point, and for ease of illustration they do not show any parts which lie behind the plane of the cross-section. As with FIG. 1, although the devices have the same sectional shape (and hence the shape of the duct does not change), they modify the sectional profile of duct so that its shape rotates about the duct axis between the different stations (due to the different angular positions of the devices) as can be seen by comparing FIGS. 8-10. Thus the sectional profile of the duct is modified at a first station along the duct axis by the device 21 but not the devices 22, 23 (as shown in FIG. 8). Similarly the sectional profile of the duct is modified at a second station along the duct axis by the device 22 but not the devices 21, 23 (as shown in FIG. 9). Similarly the sectional profile of the duct is modified at a third station along the duct axis by the device 23 but not the devices 21, 22 (as shown in FIG. 10). By modifying the sectional profile of the duct so that it changes along the duct axis in this way, the devices 21-23 inhibit the formation of standing acoustic waves in the duct. Although the devices 21-23 are staggered along the duct axis without overlapping, there may be a degree of overlap between them. Also, further devices may be added so that more than one device is present at the first, second and third stations.

In the example of FIGS. 7-10 the ratio $[(R_{base}-R_{edge})/R_{base}]$ is 0.5, since the edge of each fin is half way to the geometrical centre of the duct. This leaves a channel at the centre of the duct, not containing any of the devices, with a radius $R_{edge}$.

Figure 11:
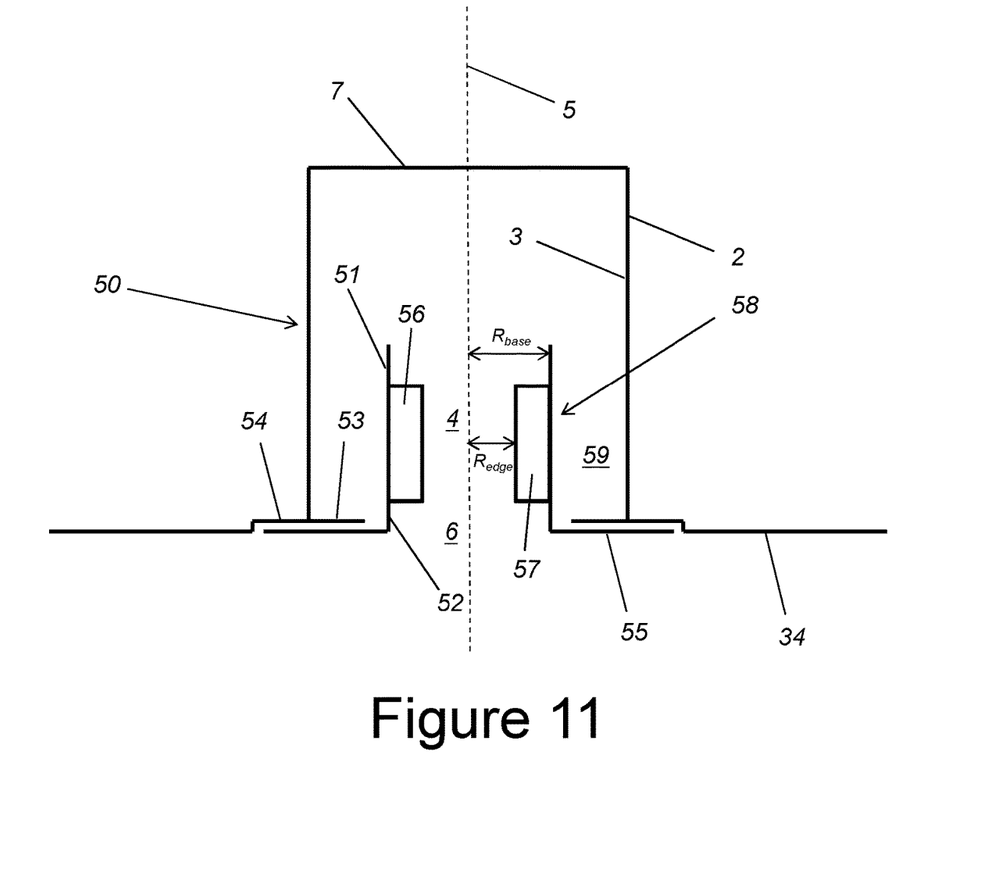
FIG. 11 is a cross-sectional view of an aircraft fuel vent pipe according to a third embodiment of the invention.

FIG. 11 shows an aircraft fuel vent pipe 50 according to a third embodiment of the invention. Many parts are the same as in the first embodiment and in this case the same reference numbers are used. The pipe body comprises an outer pipe with a cylindrical outer surface 2 and a cylindrical inner surface 3, and an insert 58 comprising an inner pipe with a cylindrical outer surface 51 and a cylindrical inner surface 52. The inner and outer pipes have annular flanges 53, 54, 55 which are secured to each other by fasteners (not shown) after the insert 58 has been inserted into the duct. The inner pipe carries fins 56, 57 which protrude into the duct and have a spiral shape like the fins in FIG. 1. The insert 58 can be retro-fitted into the fuel vent pipe of an existing aircraft. The flange 55 of the inner pipe lies flush with the aerodynamic outer surface of the lower skin 34 of the aircraft wing.

The duct axis 5 lies at the geometrical centre of the duct in the plane of the cross-section. When viewed in cross-section as in FIG. 11, the base of each device is at a distance $R_{base}$ remote from the duct axis 5 (the distance $R_{base}$ being the furthest point of the device from the duct axis 5). Each device extends into the duct 4 to a distance $R_{edge}$ at its edge which is its closest point of approach to the duct axis 5. In the example of FIG. 11 the ratio $[(R_{base}-R_{edge})/R_{base}]$ is 0.5, since each edge is half way to the geometrical centre of the duct. This leaves a channel at the centre of the duct, not containing any of the devices 56, 57, with a radius $R_{edge}$.

In the example of FIG. 11 these is an annular gap 59 between the outer surface 51 of the inner pipe and the inner surface 3 of the outer pipe. In an alternative embodiment these surfaces may abut each other so there is little or no gap between them.

In an alternative embodiment instead of containing spiral devices 10-12 or planar devices 21-23, the pipe may contain a number of wedge-shaped devices, similar to vortex generators, which each protrude towards the duct axis 5 from the inner wall 3 of the pipe body into the duct but stop short of the duct axis 5 at the centre of the duct. Each wedge-shaped device changes its cross-sectional shape and/or area as it extends along the duct axis, and inhibits the formation of standing acoustic waves in the duct. In this case, unlike the previous embodiments, the sectional shape and/or area of the duct will change between different stations along the duct axis (due to the change in shape and/or area of the wedge-shaped devices).

Figure 12:
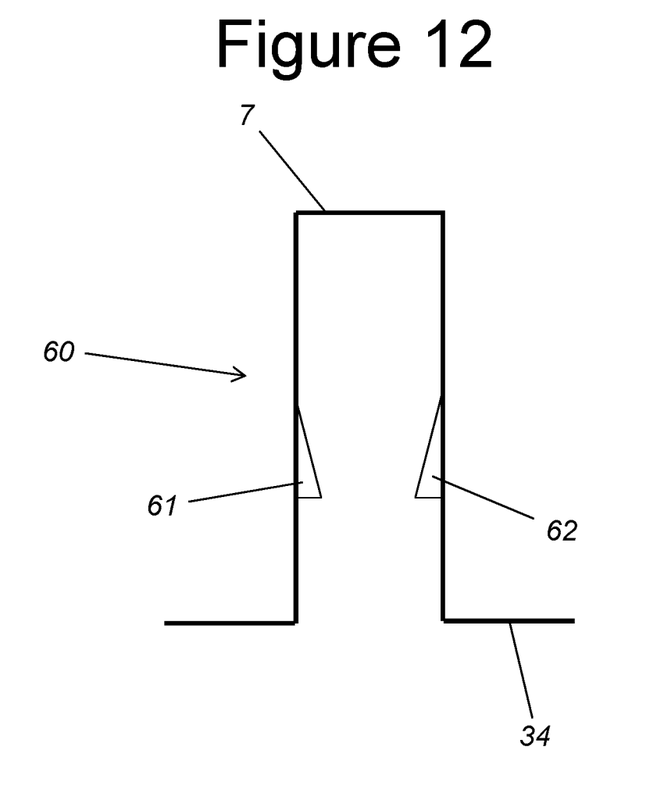
FIG. 12 is a cross-sectional view of an aircraft fuel vent pipe according to a fourth embodiment of the invention.
Figure 13:
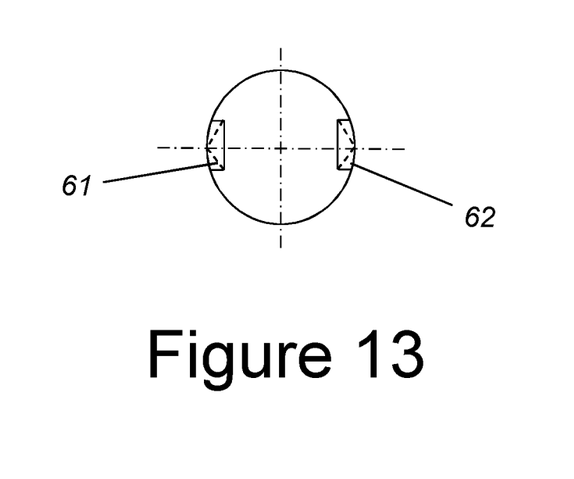
FIG. 13 is a bottom view of the fourth embodiment looking into the duct.

FIGS. 12 and 13 show a vent pipe 60 with two such wedge-shaped devices 61, 62 which taper axially as shown in FIG. 12 and also taper inwardly to sharp tips as shown in FIG. 13. In this case the tips of the wedge-shaped devices are directed upwardly so that their cross-sectional areas decrease as they extend along the duct towards the burst disc 7.

Figure 14:
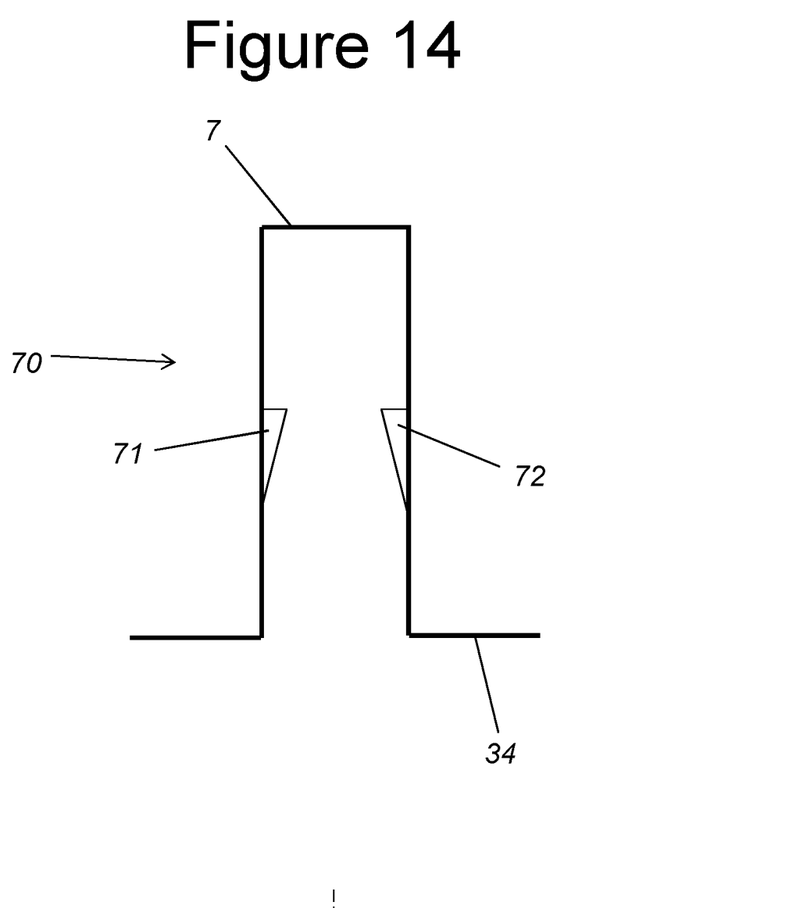
FIG. 14 is a cross-sectional view of an aircraft fuel vent pipe according to a fifth embodiment of the invention.
Figure 15:
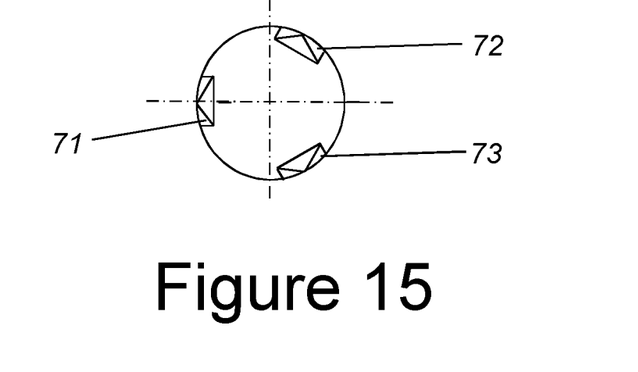
FIG. 15 is a bottom view of the fifth embodiment looking into the duct.
Figure 16:
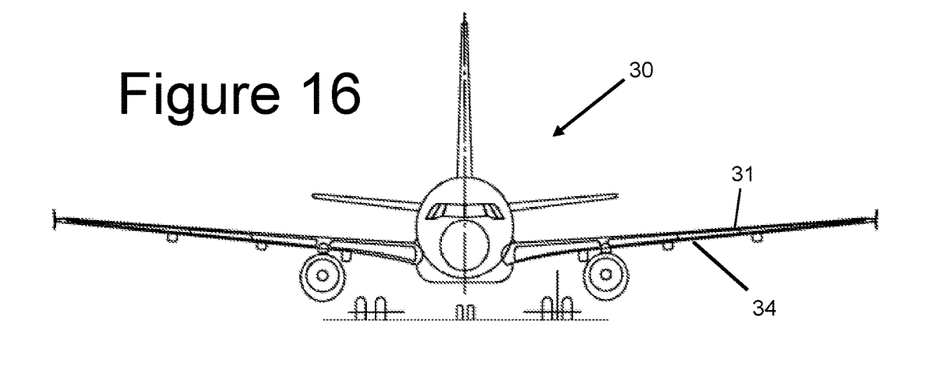
FIG. 16 is a front view of an aircraft.

FIGS. 14 and 15 show a vent pipe 70 with three such wedge-shaped devices 71-73 which taper axially as shown in FIG. 14 and also taper inwardly to sharp tips as shown in FIG. 16. In this case the tips of the wedge-shaped devices are directed downwardly so that their cross-sectional areas increase as they extend along the duct towards the burst disc 7.

In the examples of FIGS. 12-15 the wedge-shaped devices each protrude about a third of the way into the duct, so the ratio $[(R_{base}-R_{edge})/R_{base}]$ is about 0.33 (measured to the thickest part of the wedge).

Figure 17:
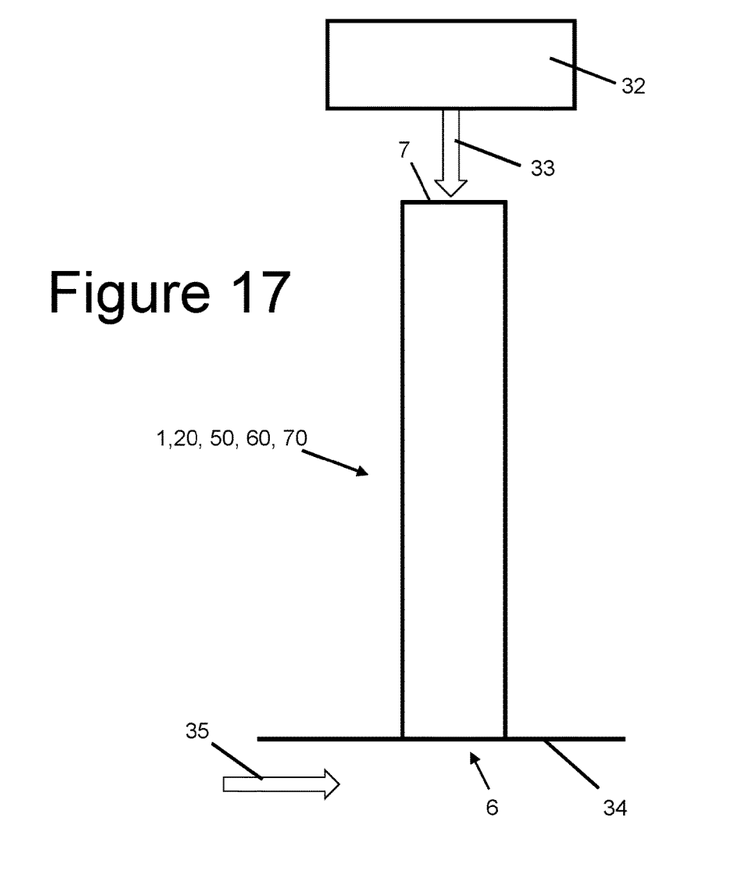
FIG. 17 is a schematic side view showing a pipe installed on the aircraft.

An aircraft 30 comprising an aircraft fuel vent pipe 1, 20, 50, 60, 70 as described above is shown in FIG. 16. The aircraft has a pair of wings 31 each containing a fuel tank 32 as shown in FIG. 17 coupled to the vent pipe 1, 20, 50, 60, 70 via a vent line 33. If the fuel tank 32 is overfilled with fuel then the burst disc 7 in the vent pipe is arranged to burst and enable excess fuel to flow from the fuel tank into the duct and out of the open end of the duct. For this reason the vent pipe extends downwardly and lies flush with the aerodynamic outer surface of the lower skin 34 of the wing. Thus the open end 6 of the duct is exposed to aerodynamic cross flow of air 35 across the open end of the duct during flight of the aircraft.

Although the invention has been described above with reference to one or more preferred embodiments, it will be appreciated that various changes or modifications may be made without departing from the scope of the invention as defined in the appended claims.

The invention claimed is:

1. An aircraft fuel vent pipe comprising:
   an aircraft fuel vent pipe body containing a duct which extends along a duct axis between an open end and a closed end;
   a burst disc which closes the closed end of the duct; and
   one or more devices in the duct, the one or more devices being positioned or shaped to enable the burst disc to be visually inspected by looking along the duct through the open end of the duct, and to inhibit the formation of standing acoustic waves in the duct.

2. The aircraft fuel vent pipe of claim 1, the one or more devices being positioned or shaped to modify a sectional profile of the duct transverse to the duct axis so that the sectional profile of the duct changes between different stations along the duct axis.

3. The aircraft fuel vent pipe of claim 1, wherein the one or more devices comprise a device with a sectional shape or an angular position about the duct axis which changes between different stations along the duct axis.

4. The aircraft fuel vent pipe of claim 3, wherein the one or more devices comprise a device with an angular position about the duct axis which changes between different stations along the duct axis.

5. The aircraft fuel vent pipe of claim 4, wherein the device has an angular position which changes along the duct axis to form a spiral shape.

6. The aircraft fuel vent pipe of claim 1, wherein the one or more devices comprise a first device and a second device which are located at different angular positions about the duct axis and offset along the duct axis so that the sectional profile of the duct is modified at a first station along the duct axis by the first device but not the second device, and the sectional profile of the duct is modified at a second station along the duct axis by the second device but not the first device.

7. The aircraft fuel vent pipe of claim 1, wherein the one or more devices extend from an inner wall of the aircraft fuel vent pipe body into the duct.

8. The aircraft fuel vent pipe of claim 1, wherein the aircraft fuel vent pipe body comprises an outer pipe, and an insert inside the outer pipe which carries the one or more device.

9. The aircraft fuel vent pipe of claim 1, wherein each device of the one or more devices is offset from the burst disc so the burst disc can burst into the duct without being impeded by the one or more devices.

10. The aircraft fuel vent pipe of claim 1, wherein each device of the one or more devices protrudes into the duct from a base remote from the duct axis to an edge, which is a closest point of approach to the duct axis of each device, the base of each device is at a distance $R_{base}$ from the duct axis, the edge of each device is at a distance $R_{edge}$ from the duct axis, and a ratio $[(R_{base}-R_{edge})/R_{base}]$ is greater than 0.1 and preferably greater than 0.2.

11. The aircraft fuel vent pipe of claim 1, wherein each device of the one or more devices protrudes into the duct from a base remote from the duct axis to an edge, which is a closest point of approach to the duct axis of each device, the base of each device is at a distance $R_{base}$ from the duct axis, the edge of each device is at a distance $R_{edge}$ from the duct axis, and a ratio $[(R_{base}-R_{edge})/R_{base}]$ is less than 0.8 and preferably less than 0.6.

12. The aircraft fuel vent pipe of claim 1, wherein each device of the one or more devices is a fin.

13. The aircraft fuel vent pipe of claim 12, wherein each device of the one or more devices is a planar fin.

14. The aircraft fuel vent pipe of claim 1, wherein each device of the one or more devices is a fin which extends into the duct from a base to an edge in the duct, wherein a length of the fin from a base of the fin to an edge of the fin is greater than its thickness.

15. The aircraft fuel vent pipe of claim 1, wherein each device of the one or more devices extends radially into the duct towards the duct axis.

16. The aircraft fuel vent pipe of claim 1, wherein each device of the one or more devices is a wedge-shaped device which changes a cross-sectional area as the device extends along the duct.

17. An aircraft comprising an aircraft fuel vent pipe according to claim 1.

18. The aircraft of claim 17, further comprising: a fuel tank coupled to the aircraft fuel vent pipe, the burst disc being arranged to burst and enable fuel to flow from the fuel tank into the duct and out of the open end of the duct.

19. The aircraft of claim 17, wherein the aircraft fuel vent pipe is positioned so that the open end of the duct is exposed to aerodynamic cross flow of air across the open end of the duct during flight of the aircraft.

20. An aircraft fuel vent pipe comprising:
an aircraft fuel vent pipe body containing a duct which extends along a duct axis between an open end and a closed end;
a burst disc which closes the closed end of the duct; and
one or more devices in the duct, the one or more devices being positioned or shaped to enable the burst disc to be visually inspected by looking along the duct through its open end, and to modify a sectional profile of the duct transverse to the duct axis so that the sectional profile of the duct changes between different stations along the duct axis.

21. An aircraft comprising an aircraft fuel vent pipe according to claim 20.

22. The aircraft of claim 21, further comprising:
a fuel tank coupled to the aircraft fuel vent pipe, the burst disc being arranged to burst and enable fuel to flow from the fuel tank into the duct and out of the open end of the duct.

23. The aircraft of claim 21, wherein the aircraft fuel vent pipe is positioned so that the open end of the duct is exposed to aerodynamic cross flow of air across the open end of the duct during flight of the aircraft.

24. A method of inhibiting the formation of standing acoustic waves in an aircraft fuel vent pipe, the aircraft fuel vent pipe comprising a pipe body containing a duct which extends along a duct axis between an open end and a closed end; and a burst disc which closes the closed end of the duct, the method comprising:
inserting one or more devices in the duct, the one or more devices being positioned or shaped to enable the burst disc to be visually inspected by looking along the duct through the open end of the duct, and to inhibit the formation of standing acoustic waves in the duct.

* * * * *